United States Patent

Hollier

Patent Number: 5,890,104
Date of Patent: Mar. 30, 1999

[54] METHOD AND APPARATUS FOR TESTING TELECOMMUNICATIONS EQUIPMENT USING A REDUCED REDUNDANCY TEST SIGNAL

[75] Inventor: Michael Peter Hollier, Suffolk, United Kingdom

[73] Assignee: British Telecommunications public limited company, London, England

[21] Appl. No.: 564,069

[22] PCT Filed: Jun. 17, 1994

[86] PCT No.: PCT/GB94/01305

§ 371 Date: Dec. 14, 1995

§ 102(e) Date: Dec. 14, 1995

[87] PCT Pub. No.: WO95/01011

PCT Pub. Date: Jan. 5, 1995

Related U.S. Application Data

[63] Continuation-in-part of Ser. No. 351,421, Dec. 12, 1994.

[30] Foreign Application Priority Data

Jun. 21, 1993 [GB] United Kingdom .................... 9312758
Jan. 6, 1994 [EP] European Pat. Off. .............. 94300076

[51] Int. Cl.$^6$ ................................. G10L 3/02; G10L 9/00
[52] U.S. Cl. ............................................................. 704/201
[58] Field of Search ..................................... 395/2.1, 2.37, 395/2.42; 370/249, 252

[56] References Cited

U.S. PATENT DOCUMENTS

| 4,352,182 | 9/1982 | Billi et al. ............................ 375/228 X |
| 4,860,360 | 8/1989 | Boggs . |
| 4,972,484 | 11/1990 | Theile et al. . |
| 5,195,124 | 3/1993 | Ishioka ........................................ 379/8 |
| 5,369,644 | 11/1994 | Oliver .................................... 371/20.4 |
| 5,490,234 | 2/1996 | Narayan .................................. 704/227 |

FOREIGN PATENT DOCUMENTS

| A3032699 | 4/1982 | Germany . |
| 2218299 | 11/1989 | United Kingdom . |
| 2218300 | 11/1989 | United Kingdom . |
| WO 94/00922 | 1/1994 | WIPO . |

*Primary Examiner*—David R. Hudspeth
*Assistant Examiner*—Robert Louis Sax
*Attorney, Agent, or Firm*—Nixon & Vanderhye, P.C.

[57] ABSTRACT

A test signal for a telecommunications apparatus includes a succession of segments of real or synthetic speech which includes different successions of the same sounds; rarely occurring sounds; and sounds at extremes of level, pitch and duration, so as to be similar to natural speech with redundancy removed. In analyzing the performance of the telecommunications apparatus the analyzer takes into account the frequency of occurrence of each sound in natural speech.

22 Claims, 5 Drawing Sheets

METHOD AND APPARATUS FOR TESTING TELECOMMUNICATIONS EQUIPMENT USING A REDUCED REDUNDANCY TEST SIGNAL

RELATED APPLICATIONS

This is a continuation-in-part of my earlier co-pending application 08/351,421 filed Dec. 12, 1994. Priority rights under 35 U.S.C. §120 are hereby claimed. This application is also related to other copending applications 08/624,489 filed Apr. 4, 1996; 08/671,931 filed Jun. 27, 1996; and PCT/GB96/01821.

BACKGROUND OF THE INVENTION

1. Field of the Invention

This invention relates to a method and apparatus for testing telecommunications apparatus.

2. Related Art

In testing telecommunications apparatus (for example, a telephone line, a telephone network, or communications apparatus such as a codec) a test signal is introduced to the input of the telecommunications apparatus, and some test is applied to the resulting output of the apparatus. It is known to derive "objective" test measurements, such as the signal to noise ratio, which can be calculated by automatic processing apparatus. It is also known to apply "subjective" tests, in which a human listener listens to the output of the telecommunications apparatus, and gives an opinion as to the quality of the output.

Some elements of telecommunications systems are linear. Accordingly, it is possible to apply simple artificial test signals, such as discrete frequency sine waves, swept sine signals or chirp signals, random or pseudo random noise signals, or impulses. The output signal can then be analyzed using, for example, Fast Fourier Transform (FFT) or some other spectral analysis technique. One or more such simple test signals are sufficient to characterise the behaviour of a linear system.

On the other hand, modern telecommunications systems include an increasing number of elements which are non-linear and/or time variant. For example, modern low bit-rate digital speech codecs, forming part of mobile telephone systems, have a nonlinear response and automatic gain controls (AGCs), voice activity detectors (VADs) and associated voice switches, and burst errors contribute time variations to telecommunications systems of which they form part. Accordingly, it is increasingly less possible to use simple test methods developed for linear systems to derive objective measure of the distortion or acceptability of telecommunications apparatus.

Recently in the paper "Measuring the Quality of Audio Devices" by John G. Beerends and Jan A. Stemerdink, presented at the 90th AES Convention, 1991 February 19–22, Paris, printed in AES Preprints as Preprint 3070 (L-8) by the Audio Engineering Society, it has been proposed to measure the quality of a speech codec for digital mobile radio by using, as test signals; a database of real recorded speech and analyzing the corresponding output of the codec using a perceptual analysis method designed to correspond in some aspects to the processes which are thought to occur in the human ear.

It has also been proposed (for example in "Objective Measurement Method for Estimating Speech Quality of Low Bit Rate Speech Coding", Irii, Kurashima, Kitawaki and Itoh, NTT Review, Vol 3. No. 5 September 1991) to use an artificial voice signal (i.e. a signal which is similar in a spectral sense to the human voice, but which does not convey any intelligence) in conjunction with a conventional distortion analysis measure such as the cepstral distance (CD) measure, to measure the performance of telecommunications apparatus.

It would appear obvious, when testing apparatus such as a codec which is designed to encode human speech, and when employing an analysis method based on the human ear, to use real human speech samples as was proposed in the above paper by Beerends and Stemerdink. In fact, however, the performance of such test systems is not particularly good.

One artificial voice test signal is disclosed in CCITT Recommendation P50 (Recommendation on Artificial Voices, Vol. Rec. P50, Melbourne 1988, published by CCITT). In the P50 test signal, there is a randomly selected sequence of 16 predetermined spectral patterns, provided in segments of predetermined length with smooth transitions between the segments. The P50 signal has a long term and short term spectral similarity to speech when averaged over about ten seconds. However, we have found that some differences between the P50 test signal and real speech are significant in testing telecommunications systems.

Another type of artificial test signal which has been proposed utilises spherically invariant random processes (SIRPs), as disclosed in Signal Processing, Vol. 12 Pt 2, March 1987; H. Brehm and W. Stammler; "Description and Generation of Spherically Invariant Speech Model Signals". This gives a signal which has the same long term spectrum as natural speech. The short term spectrum is not similar to that of natural speech, and the grouping of the sounds over time sounds subjectively very different to natural speech.

A variant called Markov (m) SIRPs attempts to model the short term spectra, but has rapid, random transitions between speech sounds which sound different to natural speech.

BRIEF SUMMARY OF THE INVENTION

Accordingly, the present invention provides a test signal comprising a sequence of sounds occurring in natural speech with reduced redundancy as compared to natural speech.

In using real speech data, several problems are encountered. To be representative, the number of individual speakers must be large, and the speech material from each speaker must be extensive, and a range of vocal levels must be considered for each speaker. Hence, the amount of natural speech material which must be played through a system under test, in order to give a reliable characterisation of the system, is very large.

The present invention is generally based on the realisation that physiological and linguistic constraints prevent certain combinations of speech sounds from occurring in natural speech, and the realisation that for testing purposes there is considerable redundancy in many of the sounds produced in human speech. Accordingly, according to the present invention, speech sounds from real human speech (either recorded or synthesised) are assembled into a structure which provides representative examples of a variety of speech sounds and levels, without redundancy, to provide a speech like test signal of feasible length. In this manner, a speech signal can be obtained which includes the formant structure, and the temporal structure, of natural speech (unlike the above SIRPs and P50 test signals) whilst remaining relatively representative and of realistic duration.

An analysis method which may be used for analysing the performance of a telecommunications system in conjunction with the test signal of the present invention is described in our earlier International application GB 93/01322 published as W094/00922 (corresponding to U.S. patent application Ser. No. 08/351,421 filed Dec. 12, 1994 now U.S. Pat. No. 5,621,854) incorporated herein by reference in its entirety.

By way of modification as described in our European patent application 94300073.7 filed on 6 Jan. 1994 (corresponding to U.S. patent application Ser. No. 08/624, 489 filed Apr. 4, 1996) and incorporated herein by reference, the analysis method may use a device for periodically deriving, from the distorted test signal, a set of spectral component signals responsive to the distortion in each of a set of spectral bands, over a succession of time intervals. This device is arranged to generate a measure of the subjective impact of the distortion due to the telecommunications apparatus. This measure of subjective impact is calculated to depend upon the spread of the distortion over time and/or said spectral bands.

Other aspects and preferred embodiments of the invention will be apparent from the following description and claims.

BRIEF DESCRIPTION OF THE DRAWINGS

The invention will now be illustrated, by way of example only, with reference to the accompanying drawings in which.

DETAILED DESCRIPTION OF EXEMPLARY EMBODIMENTS

Overview of Apparatus

Figure 1:
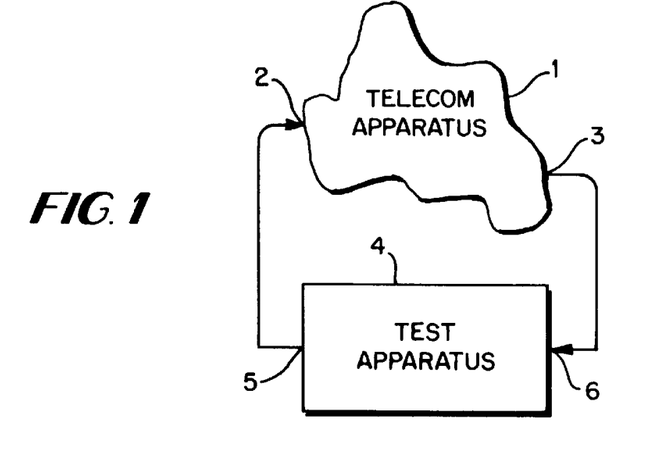
FIG. 1 is a block diagram showing the arrangement of an embodiment of the invention in use.

Referring to FIG. 1, telecommunications apparatus 1 comprises an input port 2 and an output port 3. Test apparatus 4 comprises an output port 5 for coupling to the input port 2 of the telecommunications apparatus under test, and an input port 6 for coupling to the output port 3 of the telecommunications apparatus under test.

Figure 2:
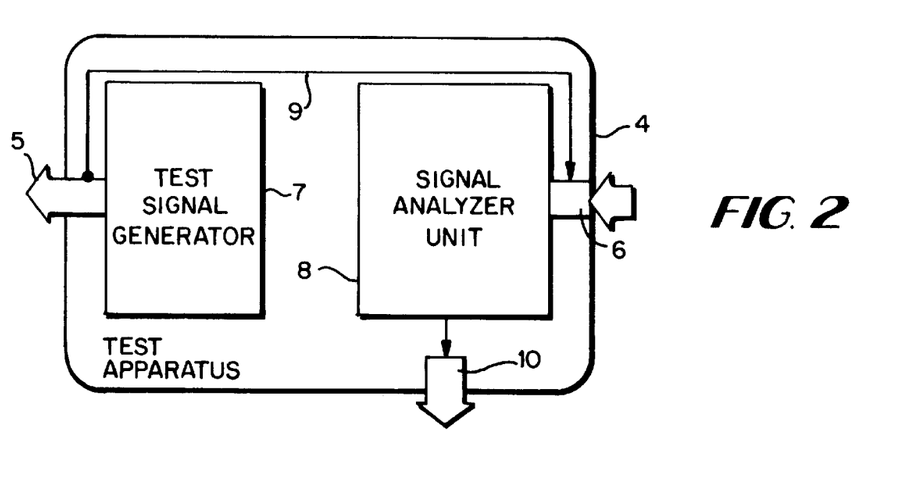
FIG. 2 is a block diagram showing in greater detail the components of an embodiment of the invention.

Referring to FIG. 2, the test apparatus 4 comprises a test signal generator 7 coupled to the output port 5, for supplying a speech-like test signal thereto, and a signal analyzer unit 8 coupled to the input port 6 for analyzing the signal received from the telecommunications apparatus 1. As is discussed in greater detail in our above-referenced International application, the analyzer 8 also utilises an analysis of the test signal generated by the test signal generator 7, and this is indicated in this embodiment by a path 9 running from the output port 5 to the input port 6.

Also provided from the analysis unit 8 is a measurement signal output port 10 at which a signal indicating some measure of the acceptability of the telecommunications apparatus (for example, distortion) is provided either for subsequent processing, or for display on a visual display unit (VDU), not shown.

First Embodiment

Test Signal Generator 7

Figure 3:
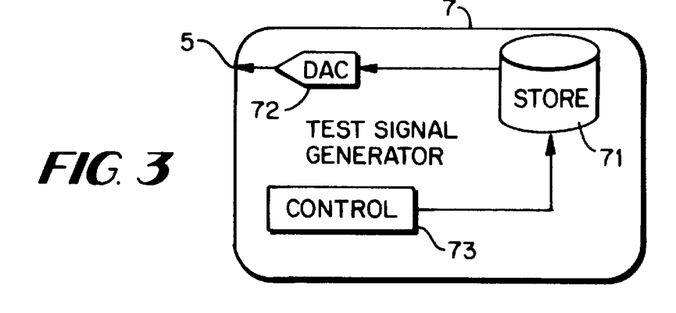
FIG. 3 is a block diagram showing in greater detail a test signal generator forming part of the embodiment of FIG. 2.

As shown in FIG. 3, in its simplest form, the artificial speech generator may merely comprise a digital store 71 (e.g. a hard disc or digital audio tape) containing stored digital data from which a speech signal can be reconstituted. The stored data may be individual digitised speech samples, which are supplied in succession from the store 71 to a signal reconstituting means 72 (e.g. a digital to analog convertor (DAC)) connected to the output port 5. The sample data stored in the store 71 comprises one or more speech utterances lasting several seconds in length (for example, on the order of ten seconds).

A control circuit 73 (e.g. a microprocessor) controls the operation of the store unit 71 to select a particular test signal to be output.

Figure 4:
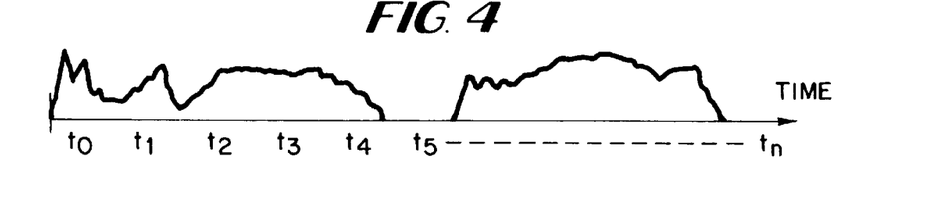
FIG. 4 shows schematically the structure of a test signal over time.

Referring to FIG. 4, the test signal data stored in the store 71 is reconstituted to form a test signal comprising a plurality of segments $t_0$, $t_1$, $t_2$ Each of the segments $t_0$–$t_n$ corresponds to a different speech sound (e.g. a different phoneme) or to silence.

Design of Test Sequence

Figure 5:
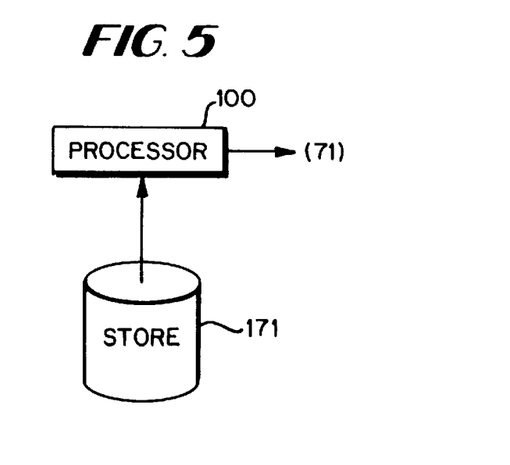
FIG. 5 is a block diagram showing the arrangement of a device for deriving a test signal sequence according to the invention.

In this embodiment, the test sequences have previously been generated by a test signal generator 100 (e.g. a digital computer) shown in FIG. 5 to which is connected a speech segment store 171 which stores a database of recorded instances of real human speech pronouncing each phoneme. The sequence generator 100 is also connected to the store 71 to write test signal sequences thereto.

The initial starting point of the test signal is the set of phonemes, of which there are 40–50 according to different definitions; for example the set defined by the International Phonetic Alphabet (described in "Mechanisms of Speech Recognition", W. A. Ainsworth, Pergamon Press, 1976).

These phonemes are divisible into several categories; firstly, into voiced and unvoiced sounds; secondly, into vowels and consonants; thirdly into plosives, fricatives, glides and so on, dependent upon spectral content and, importantly, on temporal structure.

For the purposes of the present invention, it is not necessary to test telecommunications apparatus using every sound occurring in natural speech; instead it is sufficient to pick out one or more examples from each of the above categories to form the test signal. Accordingly, the set of phonemes is reduced to a subset of 10–20 speech segments, representing different spectral content (e.g. voiced or unvoiced) and time structures (e.g. ending with the lips closed or open), which are selected in step 301 of FIG. 6.

Next, the statistical spreads of various parameters are taken into account; specifically level or energy, pitch, duration, and formant transition rate. Formants are well known in the speech art to comprise resonant peaks in the spectrum of speech, the positions of some of which vary with motion of the articulators. Each of these parameters is typically characterised by an average value, and more rarely occurring upper and lower values. Further, some of the phonemes, and some combinations of the phonemes occur more frequently on average than others. Information on these statistical distributions may be found in, for example, Richards D. L, "Telecommunication by Speech", Butterworths, 1973, or Fletcher H, "Speech and Hearing in Communication", D. Van-Nostrand, 1953, or Ainsworth W. A, "Mechanisms of Speech Recognition", Permagon Press, 1976, or O'Connor J D, and Trim J L M,"Vowel, Consonant and Syllable—A Phonological Definition", Word, Vol. 9, No. 2, August 1953.

Figure 6:
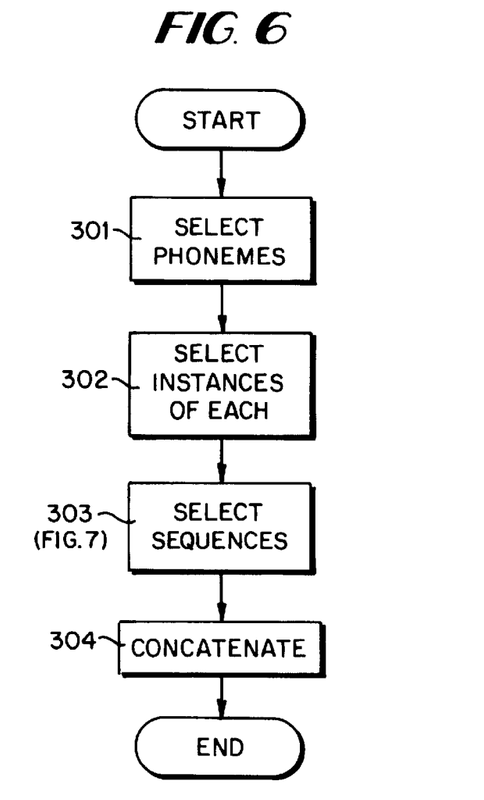
FIG. 6 is a flow diagram illustrating the process performed by the device of FIG. 5.

A superset of phonemes is then constructed in step 302, by taking several instances of each phoneme of the subset; one at a normal level (amplitude), and one at each of the high and low extremes commonly encountered in practice (for example deviating from the mean level by one standard deviation, two standard deviations or some other predetermined statistical amount), and likewise one at each extreme (high and low) of pitch encountered in natural speech, and one at each extreme (high and low) of formant transition speed encountered in natural speech for those sounds which contain formants. Thus, the superset may comprise a list of on the order of 100 speech segments comprising instances of selected phonemes. A frequency of occurrence value is stored for each phoneme of the superset.

The variability of speaker level, as measured using the method described in CCITT Recommendation P56, is found to exhibit a standard deviation of approximately 4 dB in the British telephone network.

Because many of the components of telecommunications exhibit time varying behaviour (for example echo cancellers or voice switches), the context in which each speech segment occurs (i.e. the signal portions which precede it) are significant in determining the extent to which it is distorted. For example, a speech segment preceded by silence or a low amplitude speech segment may be clipped by a voice switch, whereas no such clipping will occur if it is preceded by a high amplitude speech segment.

Accordingly, in assembling a test signal from the superset of speech segments thus created, care is taken to ensure that the same speech segment is represented in the test signal in more than one context (i.e. preceded by different speech segments), or, viewed in another way, to ensure that the test signal contains a number of different types of transition from one or type of speech segment to another. As brief silences do occur during speech, a "silence" segment is also included in the superset.

However, some transitions from one phoneme to another do not occur in natural speech; either because of physiological constraints preventing the articulators in the human vocal system from moving from one position to another immediately, or for linguistic reasons (which may vary from language to language), for example limiting the length of runs of successive consonants. Thus, some successions of speech segments are not permitted according to the invention when constructing test signals.

Figure 7:
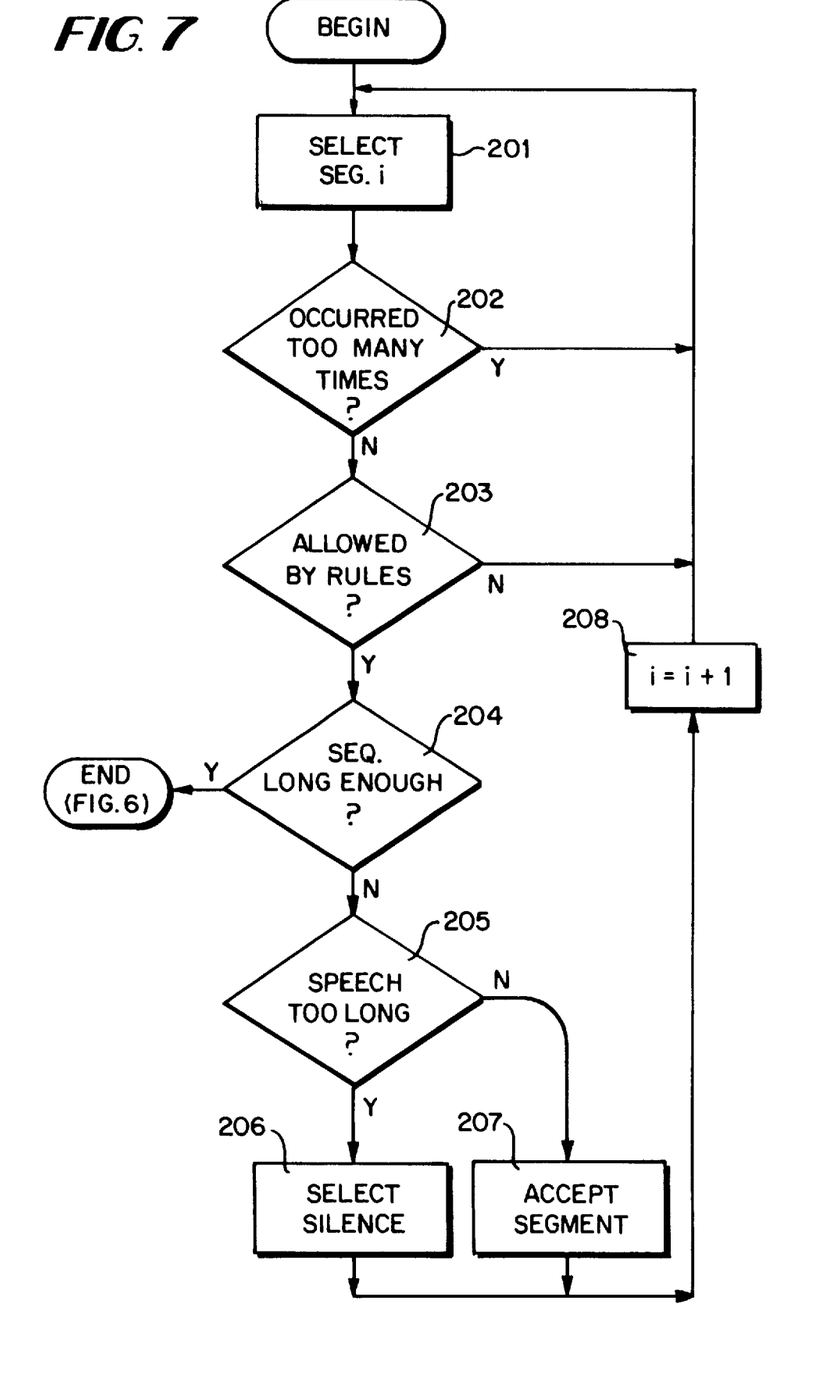
FIG. 7 is a flow diagram showing in greater detail part of the process of FIG. 6.

FIG. 7 indicates an example of an algorithm which may be used in step 303 to generate test sequences. The sequence may last on the order of 180 seconds, and be composed of a succession of segments, preferably each of variable duration, but typically on the order of a few hundred milliseconds.

In a step 201, a first speech segment ($t_0$ of FIG. 4, index i=0) is selected from the superset of speech segments, on an arbitrary or random (pseudorandom) basis.

In a step 202, a test is made as to whether the speech segment has already been used more than a predetermined number of times in the sequence, or whether the speech segment has already occurred in the sequence after the same just-preceding speech segment ($t_{i-1}$) If either of these criteria are met, the selected speech segment is not included in the sequence and instead the selection step 201 is repeated to find a new speech segment.

In a step 203, physiological and linguistic rules are applied to determine whether the selected segment could, in natural speech, follow the preceding segment ($t_{i-1}$). For example, if the segment is a consonant occurring after two preceding consonants, or a fricative occurring after two preceding fricatives, it is rejected. Such occurrence rules are well known in text-to-speech synthesis for example. If the selected segment fails these occurrence rules, the selection step 201 is again repeated.

In a step 204, the length of the sequence is tested, and if the sequence consists of a predetermined number of segments already (i.e. i=N, a predetermined constant) the sequence is complete and the process proceeds to step 304 of FIG. 6.

In a step 205, a test is made of the number of speech segments since the last silence segment in the sequence. The silence segment is a member of the superset of segments and accordingly will be selected on a random basis in the step 201. However, if more than (say) two seconds of speech segments have occurred without a silence segment, then a silence segment is selected in a step 206 in preference to the segment selected in a step 201.

Otherwise, the segment selected in the step 201 is added to the sequence in step 207, and the index counter i is incremented in a step 208. The segment selection 201 is then repeated.

Having selected the list of speech segments defining the sequence, the sample train of signal values, which in this embodiment are to be recorded in the store 71, are derived by reading the corresponding stored speech segments from the store 171, and performing digital editing of the sequence at the transition between the speech segments so as to remove discontinuities where two segments abut in step 304.

Joining or concatenating the speech segments in step 304 may be achieved using the overlap-and-add techniques commonly employed to join diphones together in synthesised announcements. Preferably the pitch-synchronous overlap and add technique (PSOLA) described in Speech Communication, volume 9, Nos. 5/6, page 453, 1990: E. Moulines and F. Charpentier; "Pitch Synchronous Waveform Processing Techniques for Text-to-Speech Synthesis using Diphones", or in proceedings IEEE, International Conference on Acoustics, Speech and Signal Processing (ICASSP) 1989, C. Hamon et al; "A Diphone Synthesis System based on time domain Prosodic Modification of Speech".

In this technique, in the edge regions of two speech segments to be joined, if both are voiced speech segments, the different pitches of the two segments are progressively tapered towards an intermediate pitch at the join between the two, and the waveforms of the two speech segments are overlap-added as is more fully described in the above references.

Any gross energy mismatches between the neighbouring speech segments are corrected by a linear resealing of the waveforms over the overlap region, and spectral mismatches are corrected using a time domain smoothing technique as described in, for example, IEEE proceedings of the International Conference on Acoustics, Speech and Signal Processing (ICASSP) 1988, F. Charpentier and E. Moulines; "Text-to-Speech Algorithms based on FFT Synthesis".

The sequence generator 100 thus concatenates the selected segments from the segment store 171 to progressively write a continuous test signal sequence of digital signal samples to the signal store 71, which is subsequently used in the test signal generator 7 to reconstitute a speech signal via the digital-to-analog converter 72.

Second Embodiment

Figure 8:
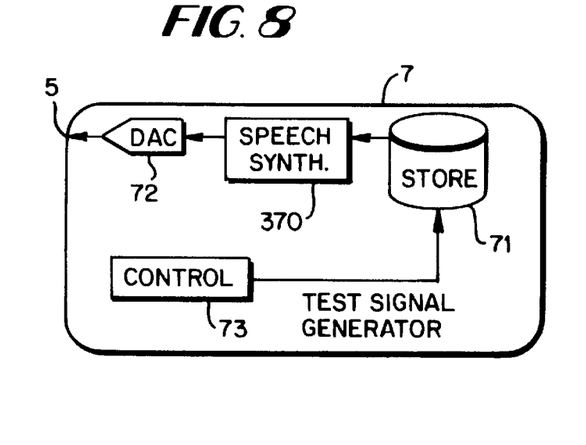
FIG. 8 corresponds to FIG. 3 and shows the structure of a test signal generator forming part of a second embodiment of the invention.

Referring to FIG. 8, in this embodiment the test signal generator 7 comprises a speech synthesizer 370 controlled by synthesis parameters supplied by a parameter store 371 to generate a synthesised speech signal via a digital to analog converter 72.

Figure 9:
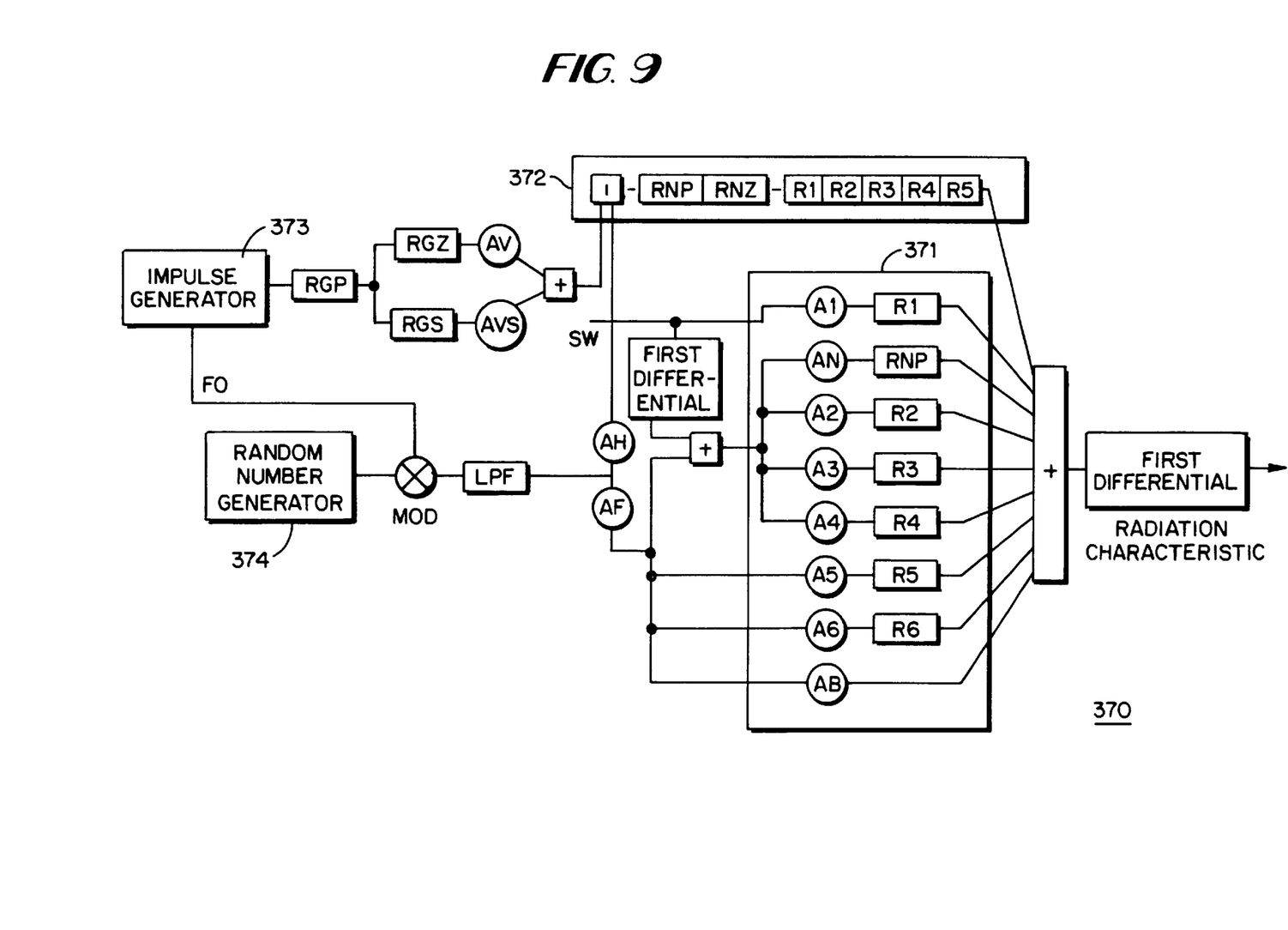
FIG. 9 is a block diagram showing in greater detail a speech synthesiser forming part of FIG. 8.

The speech synthesizer 370 is preferably a cascade/parallel formant synthesizer, described in Journal of the Acoustic Society of America (Vol. 67, No. 3, March 1980, D H Klatt; "Software for a Cascade/Parallel Formant Synthesizer", the structure of which is shown in FIG. 9, and may be provided by suitably programmed digital signal processing device (DSP). It consists essentially of a parallel bank of resonator filters 371 and a serial cascade of filters 372, connected to the outputs of an impulse generator 373 (for generating voiced speech) and a random number generator 374 generating a noise sequence (for generating unvoiced speech). The repetition rate of the impulse generator, and the characteristics of the filters, are the control parameters supplied from the parameter store 371.

In this embodiment, the sequence generator 100 operates as in the preceding embodiment except that the sequence store 171 stores sequences of control parameters for enabling the reconstruction of speech segments, and the transition between speech segments is simply achieved by tapering the values of each synthesizer parameter in the adjacent speech segments into one another into the overlap period.

Alternatively a speech synthesiser 370 of the type used in text-to-speech synthesisers or recorded announcements may be used. Such devices employ some rules which can partially replace step 203 of FIG. 7, and operate to concatenate adjacent phonemes without further input. In this case, the store 71 may store and output only phoneme identity data, level data and pitch and duration or rate data.

Analyser 8

Figures 10, 11:
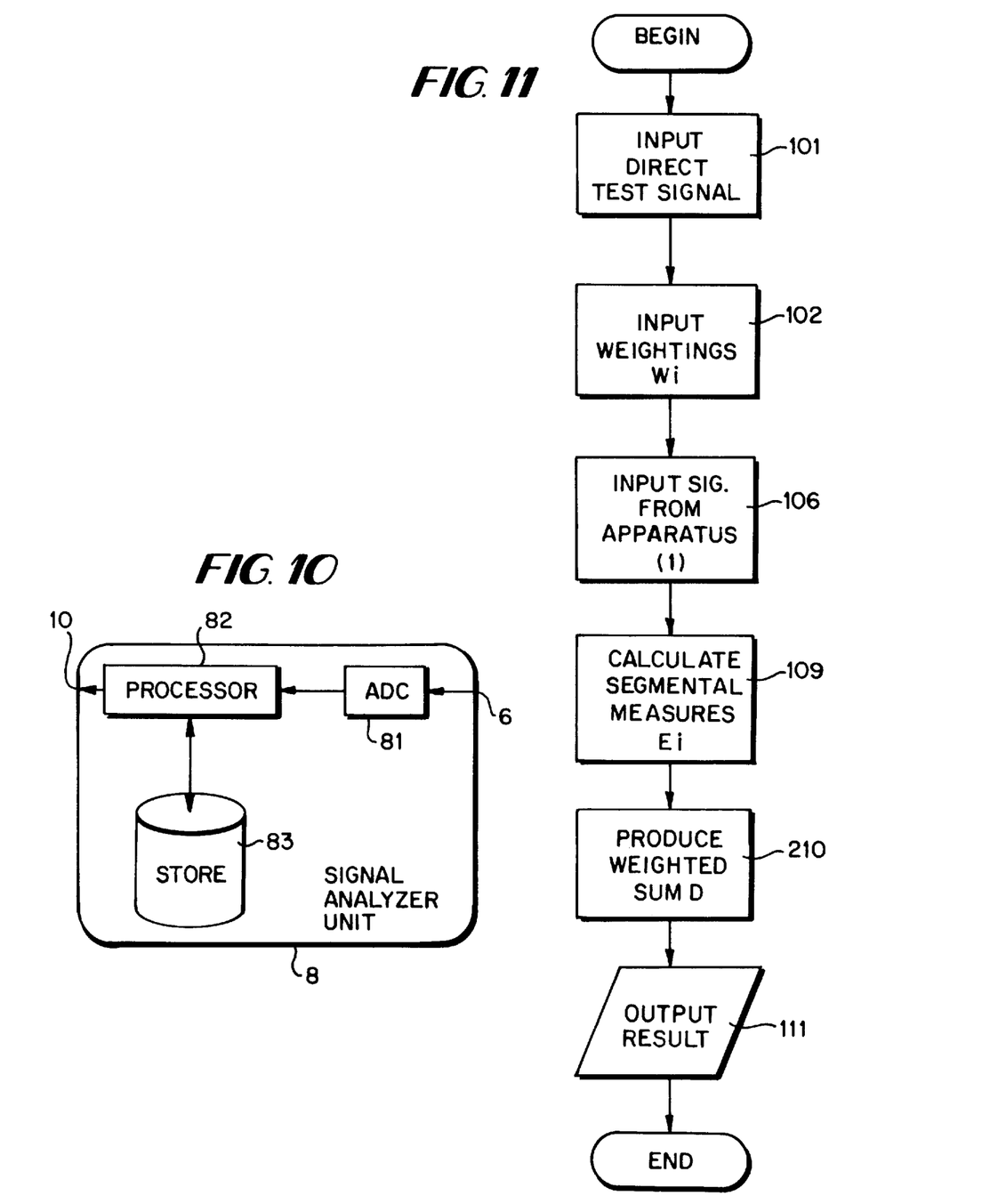
FIG. 10 is a block diagram showing in greater detail an analysis unit forming part of the embodiment of FIG. 2.
FIG. 11 is a flow diagram showing schematically the process performed by the analysis unit of FIG. 8 in an embodiment of the invention.

Referring to FIG. 10, the analyser unit 8 comprises an analog to digital converter (ADC) 81 arranged to receive signals from the input port 6 and produce a corresponding digital pulse train; an arithmetic processor 82 (for example a microprocessor such as the Intel 486 Processor or a digital signal processing device such as the Western Electric DSP 32 C or, the Texas Instruments TMS C30 device), coupled to receive the digital output of the ADC 81; a memory device 83 storing instruction sequences for the processor 82 and providing working memory for storing arithmetic results; an output line 84 from the processor 82 connected to the output 10.

The processes performed by the processor 82 correspond to those described in our above referenced International application WO94/00922 and European patent application 94300073.7, both of which are incorporated by reference herein. However, according to the present invention, data used in deriving the test signal can also be used to assist the analysis performed by the analyser 8.

In our above referenced application, the analysis process calculates one or more measures of the distortion of the test signal over a time interval. In this invention, the time interval corresponds to the time segment over which the analysis takes place, and the distortion measures calculated for all the speech segments contribute to one or more global distortion measures, and the amount by which each speech segment distortion measure contributes to the global measurement is determined in accordance with the frequency of occurrence of that speech segment. Thus, although rarely occurring phonemes, rarely occurring levels, rarely occurring pitches, rarely occurring durations and rarely occurring contexts may all be present in the test signal, the distortion which they undergo is given an appropriately low weighting in determining the performance of the telecommunications apparatus.

Referring to FIG. 11, accordingly in one embodiment, in operation the test signal generated by the generator 7 is supplied on a line 9 to the analyser 8 in a step 101. In a step 102, a sequence of weighting data, one weight value $W_i$ for each segment $t_i$ of the test sequence, are supplied from the test signal generator 7 to the analyser 8. The weighting data may simply be equal to the probability of occurrence of the speech segment concerned in natural speech; i.e. the probability of occurrence of that phoneme at that level at that pitch and at that duration, and optionally, may also take into account the probability of that phoneme following the immediately preceding speech segment. The weightings $W_i$,(i=0-N) are stored in the store 71 together with the test signal.

In a step 106, the test signal generator 7 generates the test signal which is supplied via the telecommunications apparatus 1 to the analyser 8. In a step 109, the analyser 8 calculates, for each segment, a measure of the distortion between the uncorrupted test signal supplied on the line 9 and the test signal as distorted by the telecommunications apparatus 1, preferably using a perceptual model, and very preferably using the method described in our above referenced applications (in any embodiment thereof). The distortion measure for each segment may, for example, be the error loudness, or the total amount of error or the distribution of error as disclosed in that application. Designating the distortion measure (e.g. the amount or loudness of distortion in that segment and/or the spectral and temporal spread thereof) for each segment $E_i$, a measure $D_i$ of the total distortion of the telecommunications apparatus 1 is then calculated in a step 210 by taking the weighted sum of the segmental distortion measures $E_i$; in other words $$D = \Sigma E_i W_i$$

This measure of performance is output in a step 111, for example to a visual display unit (not shown).

In another embodiment, rather than the test signal generator 7 supplying the weightings $W_i$ it is possible for the analyser 8 to comprise a speech recogniser unit arranged to recognise the clean test signal on the line 9 and to derive therefrom the identity, level and so on of the phonemes comprising the test signal, by matching the test signal against stored data representing a complete set of phonemes, and accordingly to utilise weighting factors $W_i$ associated with the stored phoneme data.

Results of the Invention

The performance of the test signal of the invention has been compared with that of several known prior art test signals.

As compared with SIRPs generated test signals, the test signal of the present invention provides a signal which has a structure over time which is much closer to that of normal human speech. This is found to be of considerable benefit in evaluating real telecommunications systems, where the effects of time dependent components such as voice switches are subjectively very noticeable.

Further, since (unlike the SIRPs speech signal), the present invention contains voiced parts, it is better able to characterise spectral distortion of the important formant frequencies which are subjectively noticeable to the listener.

As compared to the CCITT P50 signal, the present invention provides a much more varied speech test signal which includes features such as voiced fricatives which are absent from the P50 signal. The present invention further provides a test signal with a clear formant structure, which is absent from the P50 signal. This is important because the sliding or moving formant frequencies (particularly those of the second formant) are important in the recognition of phonemes and therefore critical to the intelligibility of a speech signal in a telecommunications system.

Finally, the time structure of the speech signal of the present invention is more variable, including more rapid transitions, starts and stops, than that of the P50 test signal and hence has a detailed amplitude structure over time which is closer to natural speech. Because of the time dependence of components of a telecommunications network, the relatively slowly changing P50 test signal may not highlight distortions which clip rapid transitions.

As compared to real human speech, the test signal of the present invention has greatly reduced redundancy which makes it possible to apply extreme or rarely occurring conditions to the telecommunications apparatus 1 without maintaining the apparatus out of service for an extremely long period of time.

In this invention, a small, representative, subset of speech segments (selected from the tens of known phonemes) is utilised, and a test signal is constructed from these sounds assembled in different contextual sequences. Since distortion is being measured, it is more important that the test sequence should include successions of sounds which are relatively unlike one another or, more generally, are relatively likely to cause distortion when one follows another.

Other Alternatives and Modifications

It will be clear from the foregoing that many variations to the above described embodiments can be made without altering the principle of operation of the invention. For example, the signal from the output port 5 could be supplied in digital form to the input port 2 of the telecommunications apparatus and the ADC 81 may be dispensed with. Alternatively, an electro-mechanical transducer could be provided at the output port 5 and the signal supplied as an audio signal. In the latter case the test signal may be supplied via an artificial mouth as discussed in CCITT P.51 Recommendation on Artificial Ear and Artificial Mouth, Volume 5, Rec P.51, Melbourne 1988 and earlier UK patent application GB2218300 (8730347), both incorporated herewith by reference.

Although connections to an actual telecommunications apparatus have been described herein, it would equally be possible to programme a computing apparatus to simulate the distortions introduced by telecommunications apparatus, since many such distortions are relatively easy to characterise (for example, those due to VADs or codecs). Accordingly, the invention extends likewise to embodiments in which a signal is supplied to such simulation apparatus, and the simulated distorted output of the telecommunications apparatus is processed. In this way, the acceptability to a human listener of the combination of many complicated and nonlinear communications apparatus may be modelled prior to assembling or connecting such apparatus in the field.

Although the analysis unit 8 and test signal generator 7 have been described as separate hardware, in practice they could be realised by a single suitably processed digital processor; likewise, the telecommunications apparatus simulator referred to in the above embodiment could be provided by the same processor.

In this document, for convenience, the term "phoneme" is used to indicate a single, repeatable, human speech sound, notwithstanding that in its normal usage a "phoneme" may denote a sound which is modified by its speech context.

Although the embodiments described above relate to testing telecommunications apparatus, the application of novel aspects of the invention to other testing or analysis is not excluded.

Accordingly, protection is sought for any new matter or combination of new matter disclosed herein, together with variations thereof which would be apparent to the skilled reader, whether or not such matter or variations are within the scope of the following claims.

Alternatively, the store 71 may store speech data in the form of filter coefficients to drive an LPC speech synthesizer, for example, or higher level data (e.g. phoneme, pitch and intensity data) to drive a phoneme synthesizer comprising the reconstituting means.

I claim:

1. A method of generating a test signal for testing telecommunications apparatus, the test signal comprising:

a sequence of segments, each segment reproducing a basic phoneme found in natural speech;

wherein the sequence provides representative examples of a variety of basic phonemes and phoneme attributes, including formant structures and temporal structures corresponding to natural speech wherein no phoneme appears with the same attributes more than once and the sequence is generated by selecting speech segments from a store in which each basic phoneme occurring in natural speech is represented; and wherein, if within the sequence there is generated a subsequence of two or more basic phonemes which cannot occur in natural speech for linguistic or physiological reasons, such a subsequence is identified and excluded from forming part of the test signal transmitted.

2. A test signal as in claim 1, wherein some of the basic phonemes in the sequence comprise voiced fricatives.

3. A test signal as in claim wherein some of said basis phonemes are present in a plurality of instances, each with different values of an attribute of speech within the sequence.

4. A test signal as in claim 3 in which one attribute value is an average value, and at least one other is a more rarely occurring attribute value.

5. A test signal as in claim 3 in which the attribute includes at least one of volume, pitch, and duration.

6. A test signal as in claim 3 in which the attribute includes a co-articulation effect.

7. A test signal as in claim 6 in which the attribute includes formant transition rate.

8. A test signal as in claim 6 in which some of said basic phonemes are present in a plurality of instances, each instance immediately following a different predecessor phoneme.

9. A test signal as in claim 6 in which smoothed transitions between the characteristics of each segment and its following segment are represented.

10. A test signal as in claim 1 comprising concatenated segments of prerecorded human speech.

11. A method as in claim 1 comprising the step of generating, for each segment selected, smoothed transitions between the characteristics of that segment and the immediately preceding segment in the sequence.

12. A method of testing telecommunications apparatus, the method comprising the steps of:

supplying thereto a test signal comprising a sequence of basic phonemes corresponding to parts of words found in natural speech, analyzing a signal output from the telecommunications apparatus on each of said segments; and forming from said signal output an overall measure of the distortion caused by the telecommunications apparatus, the test signal providing representative examples of a variety of basic phonemes and phoneme attributes, including formant structures and temporal structures corresponding to natural speech wherein no phoneme appears with the same attributes more than once, and a signal representing the frequency of occurrence in natural speech of each segment;

the overall measure of distortion being based on the distortion of each segment and its frequency of occurrence in natural speech.

13. A method as in claim 12 wherein some of said basic phonemes are present in a plurality of instances, each with different values of an attribute of speech within the sequence.

14. A method as in claim 13 in which one attribute value is an average value, and at least one other is a more rarely occurring attribute value.

15. A method as in claim 13 in which the attribute includes at least one of volume, pitch and duration.

16. A method as in claim 13 in which the attribute includes a co-articulation effect.

17. A method as in claim 16 in which the attribute is formant transition rate.

18. A method as in claim 16 in which some of said basic segments are present in a plurality of instances, each instance immediately following a different predecessor segment.

19. A method for producing a test signal and testing telecommunications apparatus, the method comprising the steps of:

supplying thereto a test signal comprising a sequence of basic phonemes corresponding to parts of words found in natural speech, analyzing a signal output from the telecommunications apparatus on each of said segments; and forming from said signal output an overall measure of the distortion caused by the telecommunications apparatus, the test signal providing representative examples of a variety of basic phonemes and phoneme attributes, including formant structures and temporal structures corresponding to natural speech wherein no phoneme appears with the same attributes more than once and a signal representing the frequency of occurrence in natural speech of each segment;

the overall measure of distortion being based on the distortion of each segment and its frequency of occurrence in natural speech;

said method including producing a test signal by repeatedly selecting individual speech segments from a superset of such segments to form a subset of predetermined length, wherein the following steps are performed for each speech segment so selected:

testing for the presence of the individual segment in the subset more than a predetermined number of times, testing the immediately preceding member of the subset, to determine if the sequence of the selected segment and the immediately preceding segment is excluded by physiological and/or linguistical constraints, if either condition occurs, rejecting the segment and selecting a further segment from the superset; and wherein the resulting sequence is digitally edited so as to remove discontinuities between segments.

20. Test apparatus for testing telecommunications apparatus, the test apparatus comprising:

means for supplying a test signal to the apparatus under test, the test signal comprising a sequence of basic phonemes corresponding to parts of words found in natural speech, means for returning the signal, as modified by the apparatus under test, to the test apparatus, and means for analyzing the signal output from the telecommunications apparatus on each of said segments;

the means for supplying the test signal being arranged to supply a test signal in which the segments are assembled into a sequence which provides representative examples of a variety of basic phonemes and phoneme attributes, and which includes a formant structure and temporal structure corresponding to natural speech wherein no phoneme appears with the same attributes more than once, and the analysis means including means for forming an overall measure of the distortion caused by the telecommunications apparatus based on the distortion of each segment and its frequency of occurrence in natural speech.

21. Apparatus as in claim 20, wherein the test signal supply means is arranged to supply a test signal comprising a sequence of basic phonemes corresponding to parts of words found in natural speech, some of said basic phonemes being present in a plurality of instances, but with different values of an attribute of speech.

22. A method of testing telecommunications apparatus, said method comprising:

supplying to said apparatus a test signal comprising a plurality of signal segments corresponding to speech like sounds, in which the represented sounds which occur relatively rarely in natural speech have a higher relative frequency of occurrence;

analysing the signal output from the telecommunications apparatus on each of said sounds; and forming an overall measure of the distortion caused by the telecommunications apparatus based on the distortion of each signal segment sound and its frequency of occurrence in natural speech.

* * * * *

UNITED STATES PATENT AND TRADEMARK OFFICE
CERTIFICATE OF CORRECTION

PATENT NO. : 5,890,104
DATED : March 30, 1999
INVENTOR(S) : Hollier et al.

It is certified that error appears in the above-indentified patent and that said Letters Patent is hereby corrected as shown below:

ON THE TITLE PAGE:

Under item [30], add --Jun. 24, 1992 [GB] United Kingdom.........9213459--.

Under item [63], before "Ser. No." add --U.S. Patent No. 5,621,854 issued Apr. 15, 1997 from application--.

Column 1, line 8, after "filed Dec. 12, 1994" add --(now U.S. Patent No. 5,621,854 issued Apr. 15, 1997)--.

Column 1, line 11, after "filed Apr. 4, 1996" add --(now U.S. Patent No. 5,794,188 issued Aug. 11, 1998)--.

Column 1, line 11, after "filed Jun. 27, 1996" add --(now U.S. Patent No. 5,799,133 issued Aug. 25, 1998)--.

UNITED STATES PATENT AND TRADEMARK OFFICE
CERTIFICATE OF CORRECTION

PATENT NO. : 5,890,104
DATED : March 20, 1999
INVENTOR(S) : Hollier et al.

It is certified that error appears in the above-indentified patent and that said Letters Patent is hereby corrected as shown below:

Column 1, line 12, after "PCT/GB96/01821.", insert: --This application is also based on PCT/GB93/01322 and PCT/GB94/01305. Priority rights under 35 U.S.C. §§ 365 and 371 are claimed.--

Column 3, line 9, after "filed Apr. 4, 1996" add --now U.S. Patent No. 5,794,188--.

Signed and Sealed this

Twenty-seventh Day of March, 2001

Attest:

NICHOLAS P. GODICI

Attesting Officer

Acting Director of the United States Patent and Trademark Office